3,347,706
GALVANIC BATTERY COMPRISING A POSITIVE ACTIVE MASS CONSISTING ESSENTIALLY OF NICKELIC OXIDE
Frank J. Krivanek, Parma, and Nelson C. Cahoon, Fairview Park, Ohio, assignors to Union Carbide Corporation, a corporation of New York
No Drawing. Filed Jan. 6, 1964, Ser. No. 336,025
2 Claims. (Cl. 136—28)

This invention relates to galvanic batteries having a positive active mass consisting essentially of nickelic oxide.

One of the more important applications of nickelic oxide is as the active material of the positive electrode of an alkaline galvanic battery. The positive electrode of a nickel-cadmium battery in the charged state comprises nickelic oxide. Such batteries are usually manufactured by making both the positive electrode and the negative electrode in the discharged state, immersing the discharged electrodes in an alkaline electrolyte with a suitable separator and "forming" the electrodes into the desired charged materials.

The conventional formation process ordinarily consists of alternately charging and discharging the assembled battery. This procedure, referred to as "formation cycling," is necessary to place the electrodes in a condition at which the battery will function with reasonable efficiency.

Since the early days of alkaline batteries this formation cycling has always been a considerable problem. The process is time consuming and costly.

It is apparent therefore that it would be desirable to be able to make the electrodes, both positive and negative, in a charged state. For a nickel-cadmium battery, this would require the availability of a suitable negative active material, i.e., metallic cadmium and a suitable positive active material, i.e., nickelic oxide. These materials must be such that they can be formed into electrodes, which provide electrochemical performance at least as good as electrodes made by formation cycling. Moreover, these materials must possess sufficient stability to permit storage both before and after assembly into the battery.

Among the more commonly encountered forms of nickelic oxide is the beta form and the gamma form.

Beta nickelic oxide is believed to have the formula $Ni_2O_x \cdot YH_2O$ wherein $x$ is between about 2.9 and 3.2 and $Y$ ranges from about 1 to 3. This material has a theoretical available oxygen content of about 7.29 weight percent.

Gamma nickelic oxide is believed to have the formula $Ni_2O_x \cdot YH_2O$ wherein $x$ is about 3.5 and $Y$ ranges from 1 to 3.

It is apparent that the material identified as gamma nickelic oxide, having a formula of $Ni_2O_{3.5} \cdot 2H_2O$ would have 50 percent more available oxygen than the beta form having the formula $Ni_2O_{3.5} \cdot 2H_2O$. This higher available oxygen content would provide a greater electrochemical output per unit weight and thus provide a considerable advantage to the battery manufacturer. For example, the calculated amount of material necessary to provide one ampere hour would be 3.74 grams of beta nickelic oxide as compared to 2.53 grams of gamma nickelic oxide. Unfortunately, however, nickelic oxides when prepared by methods other than formation cycling, i.e., by means other than electrochemical means, do not provide battery service which is equivalent to the electrochemically formed nickelic oxide. The chemically formed nickelic oxides are particularly deficient with respect to stability. Moreover, the chemical manufacturing process is usually complex and not easily adaptable to commercial production methods.

Previous chemical processes for the preparation of nickelic oxide are set forth in an atricle gy O. Glemser et al., Z, anorg. Chem., 261 (1950), pp. 26–42.

Table I below contains data taken from this article, which is illustrative of the instability of the nickelic oxides produced by the prior art chemical processes.

TABLE I

[Stability of freshly precipitated nickel (III) hydroxide made by the Glemser et al. process to water and to 0.1 N sodium hydroxide at room temperature]

| Time in Months | Amount of Oxygen Present is Represented by x in formula $Ni_3O_x \cdot YH_3O$ | | |
|---|---|---|---|
| | Water | | 0.1 N NaOH |
| | Damp | Dry | |
| 0 | 3.18 | 2.98 | 3.18 |
| .5 | 2.82 | 2.80 | 2.78 |
| 1 | 2.76 | 2.76 | 2.76 |
| 2 | 2.68 | 2.68 | 2.66 |
| 3 | 2.66 | 2.66 | 2.64 |
| 4 | 2.64 | 2.64 | 2.64 |
| 8 | 2.66 | | |

In the course of the work relating to nickelic oxides and this invention, it has been discovered that stable nickelic oxides having empirical formulas corresponding to the previously described beta and gamma nickelic oxides can be produced by a chemical process. These highly stable forms of the nickelic oxides are significantly different from the previously discussed beta and gamma forms with respect to stability and crystallinity. To avoid confusion these stable forms of nickelic oxide will be referred to hereafter as "delta" and "lambda" nickelic oxides. The delta form is analogous to the prior art beta nickelic oxide and the lambda form is analogous to the prior art gamma nickelic oxide.

It has been found that the delta and lambda nickelic oxides possess physical and chemical properties which make them valuable chemical materials. Both are significantly more stable than the corresponding beta or gamma form.

These forms of nickelic oxide can be used in the manufacture of alkaline batteries which require nickel oxide electrodes e.g., nickel-cadmium. In particular these forms of nickelic oxide are useful as the positive active mass of the positive electrode of a nickel-cadmium battery. They are also suitable for use as oxidizing agents particularly in cases where a stable solid oxidant is required for use in an alkaline environment.

In the identification of the delta and lambda nickelic oxides and in distinguishing them from the conventional beta and gamma forms, the X-ray diffraction patterns have been found to be a useful tool. In obtaining X-ray powder diffraction patterns standard techniques were employed. The radiation was the $K_1$ of copper, and a Geiger counter spectrometer with a strip chart pen recorder was used to record the height of the peaks and the position of the peaks. In the tables and data set forth, $d$, the interplanar spacing, is given in angstroms and I is the relative intensity calculated with respect to the strongest line or peak in the pattern. The ratio of the intensity of any given line and the intensity of the strongest line in the pattern may conveniently be referred to as the intensity ratio for the less intense line. Such values are given in terms of percent.

X-ray diffraction data for both the delta and lambda crystal types indicate a hexagonal unit crystal. Similar studies show that beta and gamma crystal types are also hexagonal. However, the delta and lambda forms are of a significantly different crystal habit in that they have a much lower degree of crystal perfection. The delta and lambda forms are very poorly crystallized and are in the form of hexagonal platelets whereas the beta and gamma crystal types are more perfectly crystallized in the form of a nearly-perfect hexagonal prism.

Table II below presents the relative intensities and the position in angstroms of the peaks in the X-ray diffraction pattern of six samples of delta nickelic oxide as compared to the X-ray diffraction pattern of the beta nickelic oxide. The beta nickelic oxide patterns are taken from the previously mentioned article by Glemser et al. and from American Society For Testing Materials X-ray diffraction pattern card number 6–0141. The relative intensity values in Table II are calculated on the basis of the intensity of the strongest line in each pattern as being equal to 100 and the other lines in proportion thereto. Table II clearly illustrates the difference in the degree of crystal perfection which distinguishes the delta form of nickelic oxide from the beta form and indicates that these two crystal types are properly regarded as different entities.

TABLE II

[Relative Peak Intensities of X-ray Diffraction Lines in Delta and Beta Crystal Types of Nickelic Oxide]

| Peak d in A | 4.68 | 2.35 | 1.41 |
|---|---|---|---|
| Samples of Delta Ni$_2$O$_3$: | | | |
| 1 | 100 | 26 | 7 |
| 2 | 100 | 25 | 7 |
| 3 | 100 | 40 | 11 |
| 4 | 100 | 26 | 5 |
| 5 | 100 | 39 | 17 |
| 6 | 100 | 37 | 12 |
| Samples of Beta Ni$_2$O$_3$: | | | |
| ASTM Card 6-0141 | 100 | 80 | 80 |
| Glemser (Supra) | 100 | 70 | 70 |

In comparison with the beta form, the delta crystal type is characterized by a 2.35 line which is between 25 and 40 percent of the 4.68 line and a 1.41 line which is between 5 and 17 percent of the 4.68 line. Such differences in crystal perfection are considered significant characteristics in the identification of a crystal material.

The delta nickelic oxide can be characterized as a poorly crystalline hexagonal system having an X-ray diffraction pattern characterized by the reflections set forth in Table II and having characteristic ratios of relative intensities, and having the formula Ni$_2$O$_x$·YH$_2$O wherein $x$ is between 2.8 and about 3.3 and Y is between 1 and 6. In all cases the delta crystal type is characterized by having a much smaller ratio between the most prominent line and each of the minor lines than the beta form. For example both the 2.35 and the 1.41 line are 80 percent of the 4.68 line for beta nickelic oxide.

Table III shows X-ray diffraction patterns of two samples of lambda nickelic oxide as compared to the X-ray diffraction pattern of gamma nickelic oxide. The gamma nickelic oxide patterns are taken from American Society for Testing Materials X-ray pattern card number 6–0075. Here again, it is apparent that the gamma and lambda crystal types are properly considered as different entities.

The lambda nickelic oxide is characterized as a poorly crystalline hexagonal system having an X-ray diffraction pattern characterized by the reflections and intensities set forth in Table III and having the formula Ni$_2$O$_x$·YH$_2$O wherein $x$ is between about 3.3 and about 3.9 and Y is between 1 and 6. In comparing the gamma and lambda crystal patterns it is apparent that the gamma material is characterized by a number of lines which do not appear in the lambda pattern. Moreover, the intensity of the lines that do appear in the lambda pattern show a substantially smaller ratio between the various lines and the strongest line in the pattern, i.e., the 7.11 line.

The particular X-ray technique and/or the instruments employed, the humidity, the temperature, the orientation of the powder crystals and many other variables, all of which are well known and understood to those skilled in the art of X-ray crystallography can cause minor variations in both the intensity and the positions of the lines. These variations, even when relatively large, pose no problem to the skilled X-ray crystallographer in establishing the identities of the crystal types involved. The X-ray data given herein to identify the various crystal types are not to exclude materials which fail to show all the lines or perhaps show a few extra ones that are permissible and consistent with a poorly crystallized hexagonal system. Similarly, slight variations of the line position and intensity ratio are within the acceptable parameters of the crystal structure.

An important feature of the invention is the relatively simple process by which the delta and lambda nickelic oxides can be prepared. Essentially, the process comprises forming a reaction product mixture from sodium or potassium hydroxide and nickel sulfate and subsequently oxidizing the mixture with a suitable oxidizing agent having at least sufficient available oxygen to provide

The herein referred to reaction product mixture is believed to contain initially nickel hydroxide and a form of nickel hydroxy sulfate. Without limiting the invention with respect to theory, it is believed that upon aging the nickel hydroxy sulfate becomes hydrolyzed to form nickel hydroxide. Ultimately therefore, the reaction product mixture is considered to be a suspension of nickel hydroxide in aqueous alkali hydroxide.

The term "a theoretical amount of available oxygen" refers to that amount which is calculated to be necessary to convert all the nickel hydroxide to Ni$_2$O$_3$·YH$_2$O.

The herein described lambda nickelic oxide is prepared by a process which comprises reacting a nickel salt, such as nickel sulfate, with sodium or potassium hydroxide in an aqueous environment at a temperature between 80° C. and 95° C.; aging the reaction product mixture for at least 2 hours at a temperature between 80° C. and 95° C., then oxidizing the aged reaction product mixture with an excess amount of a suitable oxidizing agent. The lambda nickelic oxide is recovered as an insoluble solid by conventional means, and dried at a temperature below about 70° C.

The formation of the lambda form of nickelic oxide is dependent on the oxidation of an aged reaction product with a substantial excess of a suitable oxidizing agent. During the oxidation phase, the pH of the mixture must be maintained high enough to prevent wasteful decomposition of the oxidizing agent, e.g., sodium hypochlorite, preferably between about 9 and 13, and more preferably

TABLE III

[Relative Peak Intensities of X-ray Diffraction Lines In Lambda and Gamma Crystal Types of Nickelic Oxide]

| Crystal Type | 7.11 | 3.54 | 2.44 | 2.39 | 2.19 | 2.12 | 1.91 | 1.79 | 1.60 | 1.47 | 1.41 | 1.39 | 1.35 | 1.32 |
|---|---|---|---|---|---|---|---|---|---|---|---|---|---|---|
| Lambda | 100 | 27 | | 13 | | | | | | | 22 | | | |
| Lambda | 100 | 34 | | 32 | | 10 | | | | | 21 | | | |
| ASTM Card [1] 600075 | 100 | 80 | 10 | 80 | 5 | 80 | 10 | 80 | 10 | 10 | 60 | 60 | | 10 |

[1] Data from Glemser and Einerhand.
Note: A line beneath the relative intensity indicates a broad peak.

between 10 and 13. Aging periods longer than 2 hours have been found to provide higher oxygen contents in the final product. For example, a lambda nickelic oxide having the formula $Ni_2O_{3.38} \cdot 2H_2O$ was obtained by oxidizing a sample which had been aged for 2 hours at 85° C. An identical sample was aged for 18 hours, during which time no additional heat was supplied. This material had a final formula of $Ni_2O_{3.5} \cdot 4.2H_2O$ and the same characteristic lambda X-ray diffraction pattern. The higher available oxygen content is attributed to the longer aging period.

Delta nickelic oxide can be prepared from commercially available nickel hydroxide or from nickel hydroxide precipitated in situ through the reaction of an alkali metal hydroxide with nickel sulfate. The precipitation reaction can be conducted either at room temperature or at elevated temperatures of 80° C. to 95° C. In any case the amount of oxidizing agent used is only slightly in excess of the theoretical amount needed to provide a nickel oxide having the formula $Ni_2O_3$. If commercially available nickel hydroxide is used, aging is unnecessary. If the nickel hydroxide is prepared in situ sufficient time must be allowed for the hydrolysis of any nickel hydroxy sulfate. The period of time required for this hydrolysis is partially dependent on the precipitation temperature. For example, about 18 hours is generally sufficient when the precipitation is carried out at a temperature of about 80° C. or above. When precipitation occurs at room temperature about 48 hours is recommended. As in the case of the lambda nickelic oxide the oxidation is carried out at a pH which is high enough to preclude substantial decomposition of the selected oxidizing agent.

Choice of oxidizing agents is not narrowly limited. Suitable strong oxidants include sodium hypochlorite, sodium hypobromite, the persulfates and the like. In general, any oxidizing agent which has a oxidation-reduction potential greater than that of the nickelic oxides at the pH of the oxidation reaction is suitable. All the oxidation reduction potential values given herein were measured against a saturated calomel electrode.

When a suitable strong oxidizing agent is employed after a sufficient aging period, the oxidation reaction is fairly rapid. In general, a period of from about 5 to 15 minutes is sufficient to oxidize substantially all the nickel hydroxide to the desired form of nickelic oxide. In order to insure a uniform product and a reasonable oxidation rate, agitation is desirable during the oxidation reaction.

In certain battery applications it may be desired to provide a battery grade nickelic oxide which is in fact a mixture of delta and lambda forms of nickelic oxide. In such cases the aging time and amount of oxidant which is employed can be conveniently adjusted to provide a desired characteristic in the final product.

It has been found that the amount of oxidant employed has a significant effect on the nature of the nickelic oxide produced. Table IV below shows this relationship. These materials were made by oxidizing nickel hydroxide with varying amounts of sodium hypochlorite. The nickel hydroxide was prepared by reacting sodium hydroxide and nickel sulfate followed by aging of the precipitate to nickel hydroxide.

*Table IV*

| Percent excess over 100% of sodium hypochlorite | Composition of product |
|---|---|
| 100* | $Ni_2O_{2.96} \cdot 1.38H_2O$ (Delta). |
| 200 | $Ni_2O_{3.11} \cdot 1.88H_2O$ (Delta). |
| 300 | $Ni_2O_{3.28} \cdot 1.80H_2O$ (Delta). |
| 400 | $Ni_2O_{3.40} \cdot 5.38H_2O$ (Delta). |
| 600 | $Ni_2O_{3.40} \cdot 3H_2O$ (Delta). |
| 850 | $Ni_2O_{3.52} \cdot 3H_2O$ (Lambda). |
| 1000 | $Ni_2O_{3.60} \cdot 3.2H_2O$ (Lambda). |

*Control=stoichiometric amount.

Both the delta and the lambda forms of nickelic oxide have been found to have significantly lower real densities than the corresponding beta and gamma forms. The difference in real densities is sufficient to distinguish them as different materials. Table V below set forth real density values which are representative of the various crystal types of nickelic oxides.

TABLE V.—REAL DENSITY VALUES OF NICKELIC OXIDES

| Formula | Crystal Type | Real Density |
|---|---|---|
| $Ni_2O_3H_2O$ | Beta | 4.15 |
| $Ni_2O_{3.06}2.5H_2O$ | Delta | 2.93 |
| $Ni_2O_{2.87}1.3H_2O$ | do | 3.51 |
| $Ni_2O_{3.04}2.0H_2O$ | do | 3.21 |
| $Ni_2O_3H_2O$ | Gamma | 3.85 |
| $Ni_2O_{3.46}2.9H_2O$ | do | 3.08 |
| $Ni_2O_{3.40}3.2H_2O$ | Lambda | 2.91 |
| $Ni_2O_{3.50}3.48H_2O$ | do | 3.39 |

An important characteristic of the delta and lambda forms of nickelic oxide is their stability with respect to oxygen loss.

Table VI illustrates the change in oxygen content for three examples of delta nickelic oxide when stored dry at room temperature over a period of 42 months.

TABLE VI.—STABILITY OF DELTA NICKELIC OXIDE

| Sample | Age | Formula |
|---|---|---|
| I | 1 month | $Ni_2O_{3.16}$ |
|   | 2 months | $Ni_2O_{3.16}6.0H_2O$ |
|   | 6 months | $Ni_2O_{3.06}4.2H_2O$ |
|   | 9 months | $Ni_2O_{3.00}2.7H_2O$ |
|   | 16 months | $Ni_2O_{2.97}2.4H_2O$ |
|   | 42 months | $Ni_2O_{2.92}1.9H_2O$ |
| II | 1 month | |
|   | 2 months | $Ni_2O_{3.10}3.5H_2O$ |
|   | 6 months | $Ni_2O_{3.02}2.5H_2O$ |
|   | 9 months | $Ni_2O_{2.95}2.0H_2O$ |
|   | 16 months | $Ni_2O_{2.93}1.9H_2O$ |
|   | 42 months | $Ni_2O_{2.90}1.8H_2O$ |
| III | 1 day | $Ni_2O_{3.10}3.6H_2O$ |
|   | 1 month | $Ni_2O_{2.99}3.5H_2O$ |
|   | 2 months | $Ni_2O_{2.94}4.1H_2O$ |
|   | 6 months | $Ni_2O_{3.02}3.8H_2O$ |
|   | 9 months | $Ni_2O_{2.98}2.9H_2O$ |
|   | 16 months | $Ni_2O_{2.96}3.2H_2O$ |
|   | 42 months | $Ni_2O_{2.90}2.1H_2O$ |

A sample lambda form of nickelic oxide was also stored in a dry form at room temperature for a period of 15 months during which time the formula was found to be substantially unchanged. At the beginning and the end of the test period the value of $x$ in the formula $Ni_2O_x \cdot YH_2O$ was found to be about $3.49 \pm .01$.

Table VII illustrates the thermal stability of delta and lambda nickelic oxides at temperatures up to about 130° C. These data were obtained by exposing each sample to a vacuum of about $1 \times 10^{-5}$ millimeters of mercury at the temperatures indicated for a period of about sixteen hours. After sixteen hours of exposure, the sample was removed and analyzed by chemical and X-ray techniques. The data indicate that the delta and lambda crystal types are chemically stable up to at least about 90° C., and that the available oxygen is present as chemically combined oxygen rather than as adsorbed oxygen.

TABLE III.—Thermal Stability

| | Value of x in formula $Ni_2O_x \cdot YH_2O$ | |
|---|---|---|
| | Delta | Lambda |
| Temperature ° C.: | | |
| 25 | 3.02 | |
| 27 | | 3.38 |
| 52 | 3.02 | |
| 53 | | 3.34 |
| 77 | 3.01 | |
| 80 | | 3.33 |
| 115 | 2.88 | |
| 130 | | 3.08 |

To illustrate the applicability of chemically prepared delta and lambda nickelic oxide to nickel-cadmium batteries, a number of test batteries were prepared. Three batteries were prepared in which the positive electrode was delta nickelic oxide and three were prepared using lambda nickelic oxide. The cells were discharged under severe conditions to a voltage of 0.9 volt. The initial voltage for the delta nickelic oxide containing batteries was found to be between 1.265 and 1.275 volts and discharge to 0.9 volt provided utilization of about 51 percent of the theoretical available ampere-hour capacity based on the chemically determined available oxygen content of the active material.

The batteries having lambda nickelic oxide as positive active material had an initial voltage of about 1.295 volts and upon discharge to 0.9 volt provided about 57 percent of the theoretical available ampere-hours based on the available oxygen content.

Nickel-cadmium batteries containing positive electrodes of either delta or lambda nickelic oxide or mixures thereof can be successfully recharged to their original electrical capacity. Thus it is possible to provide nickel-cadmium batteries, having positive electrodes of chemically prepared nickelic oxides, which can provide voltage, current and the ability to be recharged to an active state.

The following examples are illustrative of the present invention.

Example 1

A solution of nickel sulfate was prepared by dissolving 500 grams of $NiSO_4 \cdot 6H_2O$ in 2500 milliliters of water. The nickel sulfate solution was heated to 80°C. and 225 milliliters of a 45.5 weight percent sodium hydroxide solution was added, in one addition, to the nickel sulfate solution. The reaction product mixture was maintained at 80°C. and stirred for 2 hours. The initial pH of the mixture was 10.8 and at the end of the 2 hour period of agitation the pH was 11.45. The mixture was allowed to stand overnight at room temperature. Portions of the reaction product mixture were withdrawn for future testing. Each of these portions was equivalent to 100 grams of the nickel sulfate originally used. The amount of available oxygen needed to oxidize the nickel hydroxide, prepared from 100 grams of the original nickel sulfate, to $Ni_2O_3$ was calculated. One portion was then oxidized with sufficient sodium hypochlorite to provide 117.5 percent of the available oxygen which was calculated to be necessary to oxidize the nickel hydroxide prepared from 100 grams of nickle sulfate to $Ni_2O_3$. After the sodium hypochlorite solution was added to the reaction product mixture, the resulting mixture was stirred for 15 minutes after which the mixture was filtered and the residue washed with water. The filtrate showed a positive test for excess available oxygen. The residue was then dried at 60°C. for 20 hours. Upon analysis the following data was obtained:

| | |
|---|---|
| Weight of residue | 36 grams. |
| Available oxygen | 7.40 weight percent. |
| Nickel | 55.76 weight percent. |
| Surface Area | 95.7 square meters per gram. |
| X-ray diffraction pattern | Delta structure. |
| Formula | $Ni_2O_{2.98} \cdot 2.6H_2O$. |

Example 2

One of the portions obtained in the preceding example was selected to be oxidized with a large excess of oxidizing agent. As previously described, this portion contained the nickel hydroxide which was prepared from 100 grams of the original nickel sulfate. This portion was oxidized with sufficient sodium hypochlorite solution to provide 1290 percent of the oxygen needed to oxidize the nickel hydroxide to $Ni_2O_3$. After 15 minutes of stirring, the mixture was found to have a pH of 12.5 and a redox potential of 0.49 volt. The mixture was then filtered and the residue washed with water and dried at 60°C. for about 18 hours.

The analysis of the dried residue was:

| | |
|---|---|
| Weight of product | 40 grams. |
| Available oxygen | 9.70 weight percent. |
| Nickel | 50.62 weight percent. |
| Surface area | 62.6 square meters per gram. |
| X-ray-diffraction pattern | Lambda structure. |
| Formula | $Ni_2O_{3.42} \cdot 3.3H_2O$. |

Example 3

Two liters of nickel sulfate solution were prepared using 848 grams of $NiSO_4 \cdot 6H_2O$ per liter. Sufficient water was then added to bring the volume up to 5 liters. To this was added 710 milliliters of sodium hydroxide solution having a concentration of 500 grams per liter. The resulting reaction product mixture had a pH of 11.5 and was allowed to stand wth occasional stirring for a total period of 72 hours. After the first 24 hours the pH was found to be 11.7. After 48 hours the pH was adjusted to 13.1 by adding 400 milliliters of the above described sodium hydroxide solution. After 72 hours the pH was found to be 11.1 and the solution had a redox potential of 0.46 volt.

To the reaction product mixture, there was added 1500 milliliters of a sodium hypochlorite solution containing 0.0348 grams of available oxygen per milliliter. This was 101.3 percent of the theoretical amount needed to oxidize the nickel hydroxide in the reaction product mixture to $Ni_2O_3$. After the oxidation, the mixture was filtered and the residue washed with water and dried at 60°C. for about 18 hours.

The analysis of the dried residue was:

| | |
|---|---|
| Moisture | 6.1 weight percent. |
| Available oxygen | 7.19 weight percent. |
| Nickel | 58.43 weight percent. |
| X-ray diffraction pattern | Delta structure. |
| Formula | $Ni_2O_{2.90} \cdot 2.1H_2O$. |

Example 4

Fifty grams of commercially available nickel hydroxide was suspended in one liter of water. A pH of 10 was provided by the addition to the suspension of 5 milliliters of a 45.4 weight percent solution of sodium hydroxide. Then 2100 milliliters of sodium hypochlorite solution was added. This amounted to 1000 percent excess of available oxygen. The pH of the resulting mixture was found to be 12.7 and the redox potential was 0.46 volt, and the temperature 25°C. After 15 minutes of stirring the mixture was filtered, the residue washed with water and dried at 60°C. Analysis of the residue showed:

| | |
|---|---|
| Moisture | 3.0 weight percent. |
| Available oxygen | 8.37 weight percent. |
| Nickel | 58.04 weight percent. |
| X-ray diffraction pattern | Delta crystal structure. |
| Formula | $Ni_2O_{3.02} \cdot 2.0H_2O$. |

The pH values herein referred to relate to measurements obtained with conventional glass electrode and standard calomel cell equipment.

What is claimed is:

1. A galvanic battery comprising a positive and a negative electrode, both in contact with an alkaline electrolyte, said positive electrode comprising a positive active mass consisting essentially of a stable nickelic oxide composition in the form of very poorly crystallized hexagonal platelets having the formula $Ni_2O_x \cdot YH_2O$, wherein $x$ is a value of from about 2.8 to about 3.3 and Y is from 1 to 6; the X-ray diffraction pattern of said composition being characterized by at least the following d values: 4.68, 2.35 and 1.41; the line intensity for each smaller d value being substantially less than 80 percent of the strongest line which falls at a d value of about 4.68.

2. A galvanic battery comprising a positive and a negative electrode, both in contact with an alkaline electrolyte, said positive electrode comprising a positive active mass consisting essentially of a stable nickelic oxide composition in the form of very poorly crystallized hexagonal platelets having the formula $Ni_2O_x \cdot YH_2O$, wherein $x$ is a value of from about 3.3 to 3.9 and $Y$ is from 1 to 6; the X-ray diffraction pattern of said composition being characterized by at least the following $d$ values: 7.11, 3.54, 2.39, 2.12, and 1.41; the line intensity for each smaller $d$ value being substantially less than 60 percent of the strongest line which falls at a $d$ value of about 7.11

References Cited

UNITED STATES PATENTS 2,131,592   9/1938   Lange et al. _____ 136—28 X

OTHER REFERENCES

Rose, The Condensed Chemical Dictionary, 6th ed., 1956, p. 796.

WINSTON A. DOUGLAS, *Primary Examiner*

B. J. OHLENDORF, A. SKAPARS, *Assistant Examiners.*